(12) United States Patent
Iwasa

(10) Patent No.: US 8,124,324 B2
(45) Date of Patent: Feb. 28, 2012

(54) LAMINATED DIFFRACTIVE OPTICAL ELEMENT AND RESIN COMPOSITION THEREFOR

(75) Inventor: Hidefumi Iwasa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 382 days.

(21) Appl. No.: 12/356,418

(22) Filed: Jan. 20, 2009

(65) Prior Publication Data

US 2009/0190224 A1    Jul. 30, 2009

(30) Foreign Application Priority Data

Jan. 21, 2008  (JP) ................................ 2008-010932
Dec. 2, 2008   (JP) ................................ 2008-307587

(51) Int. Cl.
  *C08K 3/22*  (2006.01)
  *G02B 5/18*  (2006.01)

(52) U.S. Cl. ........ 430/321; 359/576; 524/432; 524/430; 524/409; 524/434

(58) Field of Classification Search ........................ None
See application file for complete search history.

(56) References Cited

U.S. PATENT DOCUMENTS

| | | |
|---|---|---|
| 5,847,877 A | 12/1998 | Imamura |
| 6,059,411 A | 5/2000 | Moody |
| 6,262,846 B1 | 7/2001 | Nakai |
| 2005/0190459 A1 | 9/2005 | Ukuda |
| 2006/0222859 A1 * | 10/2006 | Yasuda et al. ................ 428/413 |
| 2008/0174871 A1 * | 7/2008 | Ukuda et al. .................. 359/576 |
| 2008/0231956 A1 * | 9/2008 | Yasui ............................ 359/576 |

FOREIGN PATENT DOCUMENTS

| | | | |
|---|---|---|---|
| EP | 1065531 | | 1/2001 |
| EP | 1376157 | | 1/2004 |
| EP | 1394573 | | 3/2004 |
| EP | 1394574 | | 3/2004 |
| EP | 1947488 | * | 7/2008 |
| JP | 61-042577 | * | 3/1986 |
| JP | 05-186718 | * | 7/1993 |
| JP | 06-264009 | * | 9/1994 |
| JP | 2000-143924 | * | 5/2000 |
| JP | 2002-167576 | * | 6/2002 |
| JP | 2006-220689 | * | 8/2006 |

OTHER PUBLICATIONS

A. D. Kathman and S. K. Pitalo, "Binary Optics in Lens Design", International Lens Design Conference, 1990, SPIE vol. 1354, p. 297-309.

* cited by examiner

*Primary Examiner* — Martin Angebranndt
(74) *Attorney, Agent, or Firm* — Canon U.S.A., Inc., IP Division

(57) ABSTRACT

A resin composition includes a binder component having at least one of a monomer and an oligomer of one or more of a fluorine system and a silicone system having a polymerizable functional group in a molecule. The resin composition also includes fine metal oxide particles, and a polymerization initiator. The fine metal oxide particles include particles selected from the group of zinc oxide, indium oxide, tin oxide, antimony oxide, tin-doped indium oxide (ITO), antimony-doped tin oxide (ATO), zinc-doped indium oxide (IZO), aluminum-doped zinc oxide (AZO), and fluorine-doped tin oxide (FTO).

4 Claims, 14 Drawing Sheets

LAMINATED DIFFRACTIVE OPTICAL ELEMENT AND RESIN COMPOSITION THEREFOR

BACKGROUND OF THE INVENTION

1. Field of the Invention

The present invention generally relates to a laminated diffractive optical element in which a low-refractive high-dispersive material and a high-refractive low-dispersive material are laminated substantially without voids, and a resin composition therefor.

2. Description of the Related Art

In conventional refractive optical systems using light refraction, chromatic aberration may be reduced by combining lenses composed of glass materials with different dispersion characteristics. For example, in an objective lens of a telescope or the like, a glass material with low dispersion may be used for a positive lens, a glass material with high dispersion may used for a negative lens, and a chromatic aberration appearing on the axis can be corrected by using the combination of such lenses. However, when the configuration or number of lenses is limited, or when a limitation is placed on the glass materials that can be used, chromatic aberration is sometimes difficult to correct completely.

A. D. Kathman and S. K. Pitalo, "Binary Optics in Lens Design", International Lens Design Conference, 1990, SPIE Vol. 1354, p. 297-309 discloses a method for inhibiting chromatic aberration with several small lenses by using a combination of a refractive optical element having a refractive surface and a diffractive optical element having a diffraction grating.

This method uses a physical phenomenon where the directions in which color aberration occurs in a light beam of a certain reference wavelength at a refractive surface and a diffractive surface of the optical elements are opposite to each other. Further, a characteristic similar to that of an aspherical lens can be demonstrated by changing the period of a diffraction grating formed continuously with a diffractive optical element.

However, one light beam falling on a diffractive optical element is divided by the diffraction action into a plurality of light beams with different orders of diffraction. In this case, the diffracted light having an order of diffraction different from that of the designed order of diffraction may form an image in a location other than that in which the image is formed by the light beam with the designed order of diffraction, thereby causing flare.

U.S. Pat. Nos. 5,847,877 and 6,262,846 indicate that high diffractive effect can be realized within a wide wavelength range by optimizing the refractive index dispersion of optical elements and the shape of a grating formed on the boundary surface of optical elements. By concentrating the light flux of a useful wavelength range at a specific order (referred to hereinbelow as "designed order") of diffraction, the intensity of diffracted light with other orders of diffraction is reduced, and flare generation may be inhibited.

More specifically, the configuration described in U.S. Pat. No. 5,847,877 uses BMS81 (nd=1.64, vd=60.1; manufactured by OHARA Company) and a plastic optical material PC (nd=1.58, vd=30.5; manufactured by Teijin Chemical Ltd.), and that described in U.S. Pat. No. 6,262,846 uses COO1 (nd=1.5250, vd=50.8; manufactured by Dainippon Inks And Chemicals Co., Ltd.), a plastic optical material PC (nd=1.58, vd=30.5; manufactured by Teijin Chemical Ltd.), and BMS81 (nd=1.64, vd=60.1; manufactured by OHARA Company).

The Abbe number (vd) can be calculated with the following Equation (1).

$$vd=(n_d-1)/(n_f-n_c) \quad (1)$$

$n_d$: refractive index of d line (587.6 nm).
$n_f$: refractive index of f line (486.1 nm).
$n_c$: refractive index of c line (656.3 nm).

With the object of improving optical properties of the above-described diffractive optical element, the inventors have studied optical materials that have been marketed, researched, or developed. The distribution shown in FIG. 1A represents the results obtained. The materials of the laminated diffractive optical elements described in U.S. Pat. Nos. 5,847,877 and 6,262,846 are also included in the distribution shown in FIG. 1A.

U.S. Pat. No. 5,847,877 also discloses using a combination of a diffractive optical element molded from a material with a relatively low dispersion of refractive index, and a diffractive optical element molded from a material with a high dispersion of refractive index, in order to obtain a configuration having high diffraction efficiency within a wide wavelength range.

Thus, where the difference in dispersion of refractive index between a material with a high dispersion of refractive index and a material with a low dispersion of refractive index is large, the diffraction efficiency of the optical element configured by the materials is high and the angle of field is increased. Therefore, in order to correct chromic aberration with high accuracy, it may be necessary to use a material with a higher dispersion of refractive index (small Abbe number) and a material with a lower dispersion of refractive index (large Abbe number).

U.S. Pat. No. 6,059,411 discloses an optical material with the following relationship between refractive index (nd) and Abbe number (vd): $nd > -6.667 \times 10^{-3} vd + 1.70$ and the following relationship between the second-order dispersion ($\theta g, F$) and Abbe number (vd): $\theta g, F \leq -2vd + 10^{-3} + 0.59$. By satisfying the conditions represented by these formulas, it may be possible to increase the diffraction efficiency in the entire visible region.

Further, the optical material in U.S. Pat. No. 6,059,411 is a composite material in which a transparent electrically conductive metal oxide having high dispersion of refractive index and a low second-order dispersion characteristic is mixed and dispersed in the form of fine particles in a binder resin. ITO, ATO, $SnO_2$, ZnO, and the like are disclosed as transparent electrically conductive metal oxides.

A very strong demand has been created in recent years for miniaturization of components in optical devices using optical elements. Accordingly, developments aimed at significant reduction in thickness of optical elements have been advanced. Thus, a multilayer diffractive optical element of a voidless type, which is not the above-described laminated diffractive optical element in which a void is present between a first-layer diffractive optical element and a second-layer diffractive optical element, has been developed.

In the case of a multilayer diffractive optical element of a voidless type, in addition to a dispersion characteristic of refractive index, a refractive index characteristic of two diffractive optical elements is also important from the standpoint of increasing the diffraction efficiency. Thus, the higher the difference in refractive index between the two diffractive optical elements, the higher the diffraction efficiency. Furthermore, as in the configuration described in U.S. Pat. No. 6,059,411, it may be preferred that the second-order dispersion characteristic ($\theta g, F$) representing a linearity of the dispersion of refractive index be as small as possible.

However, in the case of optical materials described in U.S. Pat. Nos. 5,847,877 and 6,262,846, the lowest refractive index is about 1.52.

SUMMARY OF THE INVENTION

According to one aspect of the present invention, a resin composition is provided that includes a binder component having at least one of a monomer and an oligomer of one or more of a fluorine system and a silicone system having a polymerizable functional group in a molecule. The resin composition also includes fine metal oxide particles, and a polymerization initiator. The fine metal oxide particles include particles selected from the group of zinc oxide, indium oxide, tin oxide, antimony oxide, tin-doped indium oxide (ITO), antimony-doped tin oxide (ATO), zinc-doped indium oxide (IZO), aluminum-doped zinc oxide (AZO), and fluorine-doped tin oxide (FTO).

According to another aspect of the present invention, a laminated diffractive optical element is provided that includes a first diffractive optical element that is formed from the resin composition above, and in which one surface is a diffractive surface having a diffractive shape, and a second diffractive optical element that has an Abbe number higher than that of the first diffractive optical element, and in which one surface is a diffractive surface having a diffractive shape. The first diffractive optical element and the second diffractive optical element are disposed in intimate contact with each so that the diffractive surfaces thereof face each other.

The above and other objects of the invention will become more apparent from the following description taken in conjunction with the accompanying drawings.

DETAILED DESCRIPTION OF PREFERRED EMBODIMENTS

Figure 1A:
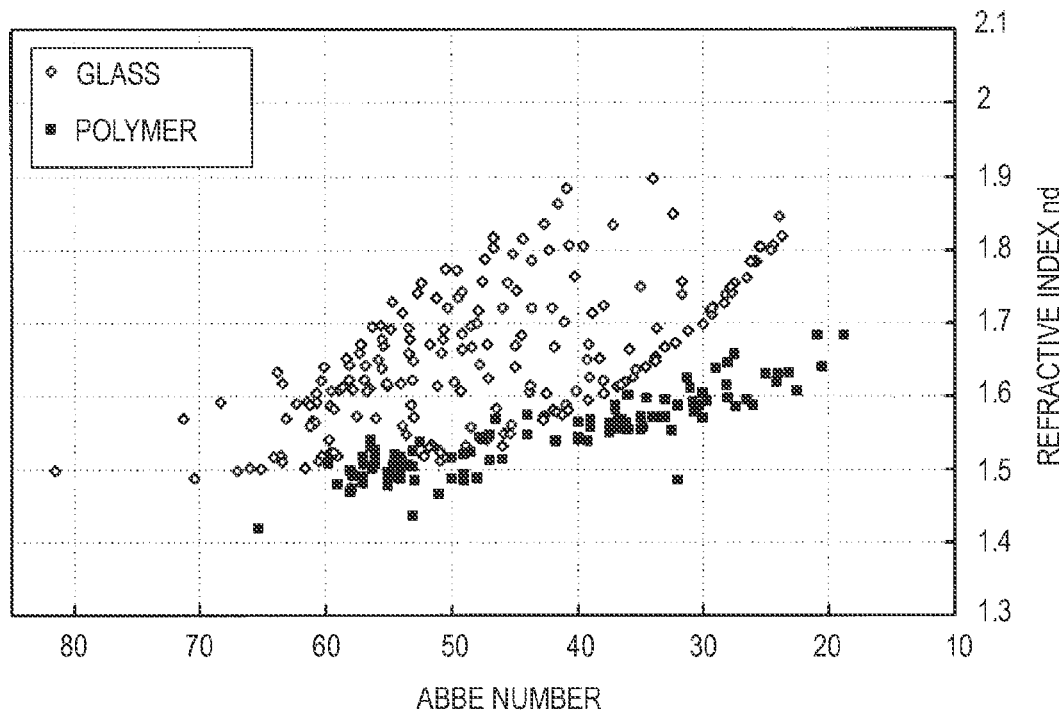
FIG. 1A is a graph illustrating the distributions of Abbe number and refractive index in optical materials.

The present invention will be described below in greater detail.

In one embodiment, the resin composition in accordance with the present invention includes: (A) a binder component having at least one of a monomer and an oligomer of one or more of a fluorine system and a silicone system having a polymerizable functional group in a molecule; (B) fine metal oxide particles; and (C) a polymerization initiator.

According to one aspect of the present invention, a resin composition is provided in which at least one of a monomer and an oligomer of one or more of a fluorine system and a silicone system is used as a binder component, to obtain handleability and a low refractive index characteristic, such as for example in a resin composition in which fine ITO particles are added to obtain a high dispersion characteristic of refractive index and a second-order dispersion characteristic. In one version, by producing a material in which an active energy polymerization initiator is added to the resin, it may be possible to obtain a solvent-free, energy-curable resin that excels in processability.

A variety of materials can be selected, for example provided that a monomer or oligomer material composition in accordance with aspects of the present invention is obtained. In one version, mutual solubility suitable for dispersants and surface treatment agents for fine particle surface can be obtained easier than with homopolymers. Thus, an optical scattering characteristic can be further improved.

Examples of fine metal oxide particles (referred to hereinbelow simply as "fine particles") provided in the resin composition in accordance with aspects of the present invention can include particles selected from the group consisting of zinc oxide, indium oxide, tin oxide, antimony oxide, tin-doped indium oxide (ITO), antimony-doped tin oxide (ATO), zinc-doped indium oxide (IZO), aluminum-doped zinc oxide (AZO), and fluorine-doped tin oxide (FTO).

In one embodiment, a variety of surface treatment agents and/or dispersants may be used for the surface of the fine particles so that the monomer and/or oligomer of the base resin and the fine particles may be better adapted for a solvent in which they may be dispersed in advance.

In one version, a mean particle size of the fine particles may be such that substantially no adverse effect is produced on light transmittance, optical scattering, and the like. For example, a mean particle size within a range of equal to or larger than 2 nm and equal to or lower than 30 nm, and even within a range of equal to or larger than 2 nm and equal to or lower than 20 nm, may be provided. However, in certain cases it can occur that, even when the mean particle size is equal to or less than 20 nm, if the particle size distribution is relatively wide and the ratio of particles with a diameter larger than 30 nm is equal to or more than 5% (percents by volume) of all the fine particles, including aggregated fine particles, a significant adverse effect may be produced on optical scattering. In such cases, at least some large fine particles may be removed by performing filtration with a filter having a pore size smaller than that of the particles that are to be removed. For example, the large fine particles may be removed in a state in which the fine particles are dispersed in a solvent prior to mixing the base resin (e.g., a slurry state), or a state in which the base resin is dissolved in the slurry, or a state in which the solvent is removed in the aforementioned state and a solvent-free system of the base resin and fine particles is obtained (in certain cases, the last approach may be impossible due to viscosity). Accordingly, in one embodiment, a mean particle size of the fine metal oxide particles may be within a range of equal to or larger than 2 nm and equal to or lower than 20 nm, and 95% or more of the fine metal oxide particles may have a particle diameter equal to or less than 30 nm.

According to one version, the fine particles may be subjected to surface treatment (e.g., surface modification). The surface treatment may also be performed at, for example, a synthesis or production stage of fine particles, or may be performed independently after the particles have been obtained.

According to aspects of the invention, fine particles of only one kind can be used, or fine particles of two or more kinds can also be used together, according to the properties for the resin composition. In one version, the mixing ratio of the (A) binder component and (B) fine particles, represented by a volume ratio, is within a range of A:B=(99 to 75):(1 to 25). Where the amount of fine particles is too large, a high transmittance is sometimes difficult to ensure due to the color of the fine particles themselves. For this reason, in one version the A:B ratio may be within a range of (90 to 82):(10 to 18). Furthermore, where the amount of fine particles is too large, they can also degrade the optical scattering characteristic.

Examples of dispersing solvents suitable for use in accordance with aspects of the present invention, such as for dissolving the binder component or dispersing the fine particles in a solvent, and optionally, for dissolving at least one of a surface treatment agent and a dispersant, may include aromatic hydrocarbons such as toluene, benzene, and xylene, alcohols such as ethanol and isopropanol, alicyclic hydrocarbons such as cyclohexane, acetic acid esters such as ethyl acetate and butyl acetate, ketones such as acetone, methyl ethyl ketone, amides such as DMF, DMAc, and NMP, aliphatic hydrocarbons such as hexane and octane, ethyl compounds such as diethylether and butyl carbitol, and halogenated hydrocarbons such as dichloroethane and tetrachlorocarbon, but this list is not limiting. In one version, the dispersing solvent may be selected with consideration for affinity for the fine particles used, and may also optionally be selected for affinity for the surface treatment agent and/or dispersant. Furthermore, a solvent of only one kind can be used, or solvents of two or more kinds can be used together, for example within a range in which dispersivity is not lost.

The following are examples of surface treatment agents and dispersants (e.g., surfactants), one or more of which may be provided in accordance with aspects of the present invention, for example for uniformly dispersing the fine particles so as to inhibit and even prevent them from aggregating. In one version, when fine particles are dispersed in a solvent, a resin, and the like, by using at least one of a surface treatment agent and a dispersant, the produced dispersion state may differ significantly depending on, for example, the type, amount added, molecular weight, polarity, and affinity of any of the surface treatment agent and dispersant that are added. In one version, pigment derivatives or agents of a resin type or a surfactant type can be advantageously employed for the surface treatment agent and/or dispersant used in accordance with the present invention. For example, cationic, weakly cationic, nonionic, or amphoteric surfactants may be effective as the surface treatment agent and/or dispersant. In one version, at least one of, polyesters, $\epsilon$-caprolactones, polycarbonates, polyphosphates, hydroxystearates, amidosulfonates, polyacrylates, olefin-maleate copolymers, acryl-maleate copolymers, alkylamineacetates, alkyl fatty acid salts, fatty acid polyethylene glycol esters, silicone systems, and fluorine systems can be used. In another version, a base-system compound of at least one kind selected from ammonia and organic amines can be advantageously used, in accordance with the present invention. Specific examples may include, but are not limited to, DISPERBYK 161, 162, 163, 164 from among the DISPERBYK series (manufactured by BYK Japan KK), Solsperse 3000, 9000, 17000, 20000, 24000, 41090 from among the Solsperse series (manufactured by Zenaga Corp.), and PO or EO modification products of alkylamines, such as TAMN-15 from among the TAMN series (manufactured by Nikko Chemical Co., Ltd.). In one version, the amounts of one or more of the surface treatment agent and dispersant that are added may generally differ depending on, for example, the type of surface treatment agent and/or dispersant, the type of fine particles, the surface area of fine particles (e.g., fine particle diameter), the type of dispersion resin for mixing with the fine particle, and the type of dispersion solvent. In accordance with one aspect of the present invention, the amounts of the surface treatment agent and dispersant may be within a range of equal to or higher than 0.1 wt. % and equal to or lower than 25.0 wt. %, based on the weight of fine particles. In certain cases, where the amount of dispersant added is too high, it may cause turbidity and induce optical scattering. In addition, in certain cases, properties (e.g., refractive index, Abbe number, second-order dispersion characteristic, modulus of elasticity, and the like) of the composition obtained by adding the fine particles may be unnecessarily decreased. Therefore, in one version, the amount of the dispersant may be within a range of equal to or higher than 4.0 wt. % and equal to or lower than 20.0 wt. %. Furthermore, a dispersant of only one kind can be used, or dispersants of two or more kinds can also be used together. In one embodiment, the binder component serving as the base resin in accordance with the present invention has at least one kind of a monomer and/or an oligomer of a fluorine system, and/or a monomer and/or an oligomer of a silicone system, having a polymerizable functional group in a molecule. In one version, the binder component may be selected to provide good mutual solubility with at least one of the solvent in which the fine metal oxide particles are dispersed, the surface treatment agent, and the dispersant.

In the case of a fluorine system, examples of the binder component used in the resin may include one or more of monomers and oligomers of at least one of a fluoroacryl system, a fluoromethacryl system, a fluoroepoxy system, and a fluorovinyl system. Specific examples may include, but are not limited to, monomers such as 2,2,2-trifluoroethyl acrylate, 2,2,3,3,3-pentafluoropropyl acrylate, 2-(perfluorobutyl) ethyl acrylate, 3-perfluorobutyl-2-hydroxypropyl acrylate, 2-(perfluorohexyl)ethyl acrylate, 3-perfluorohexyl-2-hydroxypropyl acrylate, 2-(perfluorooctyl)ethyl acrylate, 3-perfluorooctyl-2-hydroxypropyl acrylate, 2-(perfluorodecyl) ethyl acrylate, 2-(perfluoro-3-methylbutyl)ethyl acrylate, 3-(perfluoro-3-methylbutyl)-2-hydroxypropyl acrylate, 2-(perfluoro-5-methylhexyl)ethyl acrylate, 3-(perfluoro-5-methylhexyl)-2-hydroxypropyl acrylate, 2-(perfluoro-7-methyloctyl)ethyl acrylate, 3-(perfluoro-7-methyloctyl)-2-hydroxypropyl acrylate, 1H,1H,3H-tetrafluoropropyl acrylate, 1H,1H,5H-octafluoropentyl acrylate, 1H,1H,7H-dodecafluoroheptyl acrylate, 1H,1H,9H-hexadecafluorononyl acrylate, 1H-1-(trifluoromethyl)trifluoroethyl acrylate, 1H,1H,3H-hexafluorobutyl acrylate, 2,2,3,3,4,4,5,5-octafluorohexane 1,6-diacrylate, 2,2,2-trifluoroethyl methacrylate, 2,2,3,3,3-pentafluoropropyl methacrylate, 2-(perfluorobutyl)ethyl methacrylate, 3-perfluorobutyl-2-hydroxypropyl methacrylate, 2-(perfluorohexyl)ethyl methacrylate, 3-perfluorohexyl-2-hydroxypropyl methacrylate, 2-(perfluorooctyl)ethyl methacrylate, 3-perfluorooctyl-2-hydroxypropyl methacrylate, 2-(perfluorodecyl)ethyl methacrylate, 2-(perfluoro-3-methylbutyl)ethyl methacrylate, 3-(perfluoro-3-methylbutyl)-2-hydroxypropyl methacrylate, 2-(perfluoro-5-methylhexyl)ethyl methacrylate, 3-(perfluoro-5-methylhexyl)-2-hydroxypropyl methacrylate, 2-(perfluoro-7-methyloctyl)ethyl methacrylate, 3-(perfluoro-7-methyloctyl)-2-hydroxypropyl methacrylate, 1H,1H,3H-tetrafluoropropyl methacrylate, 1H,1H,5H-octafluoropentyl methacrylate, 1H,1H,7H-dodecafluoroheptyl methacrylate, 1H,1H,9H-hexadecafluorononyl methacrylate, 1H-1-(trifluoromethyl)trifluoroethyl methacrylate, 1H,1H,3H-hexafluorobutyl methacrylate, 2,2,3,3,4,4,5,5-octafluorohexane 1,6-dimethacrylate, hexafluoroepoxypropane, 3-perfluorobutyl-1,2-epoxypropane, 3-perfluorohexyl-1,2-epoxypropane, 3-perfluorooctyl-1,2-epoxypropane, 3-perfluorodecyl-1,2-epoxypropane, 3-(perfluoro-3-methylbutyl)-1,2-epoxypropane, 3-(perfluoro-5-methylhexyl)-1,2-epoxypropane, 3-(perfluoro-7-methyloctyl)-1,2-epoxypropane, 3-(2,2,3,3-tetrafluoropropoxy)-1,2-epoxypropane, 3-(1H,1H,5H-octafluoropentyloxy)-1,2-epoxypropane, 3-(1H,1H,7H-dodecafluoroheptyloxy)-1,2-epoxypropane, 3-(1H,1H,9H-hexadecafluorononyloxy)-1,2-epoxypropane, and 1,4-bis(2',3'-epoxypropyl)-perfluoro-n-butyl, and monomers similar thereto.

It is noted that present invention is not limited to any particular one kind of these monomers or oligomers thereof, and for example a polymer fluororesin may also be selected. Examples of copolymers may include compounds similar to Nos. 702C, 703C, 704C, 705C, 706C, 707C produced by Central Glass Co.

Further, in one embodiment a melt may be obtained by heating, for example after the monomer and/or oligomer has been compounded and the dispersion solvent has been removed. From the standpoint of handleability, in one version the composition may be provided in the form of a melt at room temperature. In a version, where the composition is, for example, a crystalline body at room temperature and melts during heating, it may be the case where it may have to be cured immediately after heating during molding, and problems may be associated with handling and molding accuracy. Other features may be selected from the standpoint of, for example, at least one of transparency, mutual solubility, dispersivity (stability), curability, moldability, and durability.

In one embodiment, the materials of a fluorine system may have low mutual solubility with other resins. Therefore, those that cause little or no turbidity or precipitation during mixing with one or more of the surface treatment agent or dispersant for fine particles, or during removal of dispersion solvent, may be selected. This is because a decrease in mutual solubility may greatly affect optical scattering and transmittance. Furthermore, cured fluororesins may typically have low heat resistance. Therefore, a resin such as an acrylic resin, that has good mutual solubility with both the monomer and the oligomer, can be added to increase heat resistance. In one version, in the cured product thus obtained, the modulus of elasticity and Tg are increased. In this case, the compounding may be performed with consideration for, for example, fluctuations of optical properties such as refractive index.

In one embodiment, a compound of only one kind can be used, or alternatively compounds of two or more kinds can be also used together as the binder component. Furthermore, the compounds as described may also be used together with the below-described component of a silicone system.

According to one embodiment, the same as described above is also true in the case of a silicone system. Examples of selected resins may thus include one or more of monomers and oligomers of at least one of a silicone acryl system, a silicone methacryl system, a silicone epoxy system, and a silicone vinyl system. Specific examples may include, but are not limited to, monomers such as 3-acryloxypropyltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 2-(3,4-epoxycyclohexyl)ethyltrimethoxysilane, 3-glycidoxypropyltrimethoxysilane, 3-glycidoxypropylmethyldimethoxysilane, 3-glycidoxypropylmethyldiethoxysilane, 3-glycidoxypropyltriethoxysilane, vinyltrichlorosilane, vinyltrimethoxysilane, and vinyltriethoxysilane, and monomers similar thereto. In one version, these components may be selected and compounded with consideration for the same or similar issues that are described above with reference to the fluorine system.

In one version, the content of the binder component in the resin composition in accordance with aspects of the present invention may be such as to obtain the mixing ratio of the (A) binder component and (B) fine particles, represented by a volume ratio, within a range of A:B=(99 to 75):(1 to 25). In a case where the amount of fine particles is too large, a high transmittance is sometimes difficult to ensure due to the color of the fine particles themselves. For this reason, in one version, the A:B ratio may be selected to be within a range of (90 to 82):(10 to 18). Furthermore, in a case where the amount of fine particles is too large, it can degrade the optical scattering characteristic.

According to one embodiment, a radical polymerization initiator can be used as a photopolymerization initiator, for example in the case of using a resin photopolymerizable with the binder component in accordance with the present invention, and a radical generation mechanism based on light irradiation can be employed. In one version, an application thereof may be for replica molding of lenses and the like. Examples of photopolymerization initiators that can be advantageously used together with the above-described binder component may include, but are not limited to, 2-benzyl-2-dimethylamino-1-(4-morpholinophenyl)-1-butanone, 1-hydroxycyclohexyl phenyl ketone, bis(2,4,6-trimethylbenzoyl)-phenyl phosphine oxide, 4-phenylbenzophenone, 4-phenoxybenzophenone, 4,4'-diphenylbenzophenone, and 4,4'-diphenoxybenzophenone. The mixing ratio of the photopolymerization initiator with the binder component can be selected according to, for example, the light irradiation amount and also the temperature of additional heating. Furthermore, this ratio can be adjusted according to the target average molecular weight of the polymer to be obtained.

In one version, when the photopolymerization initiator is used in curing and molding the resin in accordance with the present invention, the amount of the photopolymerization initiator may be selected to be within a range of, for example, an amount equal to or higher than 0.01 wt. % to an amount equal to or lower than 10.00 wt. %, based on the binder component, with the specific amount of the polymerization initiator depending on, for example, the amount of fine particles that absorb visible light. In one version, a polymerization initiator of only one kind can be used, or in another version polymerization initiators of two or more kinds can be used together, depending on, for example, the reactivity with the binder component and wavelength of light irradiation.

In one embodiment, a radical polymerization initiator can be used as a thermopolymerization initiator, for example in the case of using a resin thermopolymerizable with the binder component in accordance with the present invention, and a radical generation mechanism based on heating can be employed.

In another embodiment, a radical polymerization initiator can be used as a photopolymerization initiator, for example in the case of using a resin photopolymerizable with the binder component in accordance with the present invention, and a radical generation mechanism based on light irradiation can be employed. An application therefore may be, for example, for replica molding of lenses and the like. Examples of thermopolymerization initiators that can be advantageously used together with the above-described binder component may include, but are not limited to, azo-bis-isobutylnitrile (AIBN), benzoyl peroxide, t-butyl peroxypivalate, t-butyl peroxyneohexanoate, t-hexyl peroxyneohexanoate, t-butyl peroxyneodecanoate, t-hexyl peroxyneodecanoate, cumyl peroxyneohexanoate, and cumyl peroxyneodecanoate. The mixing ratio of the thermopolymerization initiator with the binder component can be selected according to, for example, the heating temperature and also the amount of oxygen present during molding. Furthermore, this ratio can also be adjusted according to, for example, the target degree of polymerization of the molded body to be obtained.

In one version, the amount of the thermopolymerization initiator may be selected within a range of from an amount equal to or higher than 0.01 wt. % to an amount equal to or lower than 10.00 wt. %, based on the binder component. A polymerization initiator of only one kind can be used, or alternatively polymerization initiators of two or more kinds can be used together, depending on, for example, one or more of the reactivity with the binder component and the heating temperature.

An example of a process of preparing an optical material serving as the resin composition in accordance with aspects of the present invention will be described below. A case in which a photopolymerizable binder component is used will be described as the representative example.

In one embodiment of the process, an appropriate amount of suitable surface treatment agent and/or dispersant is dissolved in the selected solvent, fine particles subjected in advance to surface treatment are added, and a uniform fine particle dispersion (e.g., a slurry) is obtained. The selected photopolymerizable binder component and photopolymerization initiator are then dissolved. In one version, when the binder component is dissolved in the slurry, it may be the case that a combination of the solvent, surface treatment agent, and dispersant are such as to lessen the deterioration of the dispersed state of fine particles caused by the addition of binder component. Filtering can also optionally be performed, and aggregated fine particles can be removed. After completing the dissolution and confirming that the fine particles have been advantageously dispersed, substantially without precipitation, the solvent may be removed by using, for example, an evaporator. In this case, the degree of evacuation may be adjusted according to at least one of the boiling point of the solvent, residual amount of solvent, and the like. In some cases, vigorous evaporation and removal of the solvent may cause deterioration of the degree to which the fine particles are aggregated and loss of dispersivity. When the solvent is removed by evacuation, heating can be also performed, for example, to a degree causing no loss of dispersivity. The optical material in accordance with an embodiment of the present invention may thus be obtained.

In one version, the obtained optical material can contain residual solvent that has not been sufficiently removed, and the content of the residual solvent may affect the durability and optical properties of the subsequently molded product. Therefore, in one version the content ratio of the residual solvent may be selected to be within a range of 0.01 to 0.50 wt. %, based on the total weight of composition from which the solvent weight has been subtracted. In the case where the degree of evacuation is too high, or when the evacuation is accompanied by heating, or when the evacuation is performed within a long period, there is a risk of also removing the surface treatment agent, surfactant, and/or monomers of the binder component, that have been added together with the solvent. For this reason, at least one of the degree of evacuation, temperature, time, and the like, may be adjusted with consideration for the molecular weight, boiling point, sublimation ability, etc., of each component.

In one embodiment, where the diffractive optical element in accordance with the present invention is molded, the photopolymerization method may be used and a die-molded body layer may be formed from the above-described optical material. When a thin layered structure comprising the optical material is formed on a light-transmitting material used for a substrate, for example, a flat glass plate may be used for the substrate, and where a metal material is used for the die corresponding to a fine diffraction grating structure, the optical material having flowability may be cast between the substrate and metal material, and lightly pressed to provide die molding. Photopolymerization of the optical material may be performed, while maintaining this stage. Light irradiation employed for such photopolymerization reaction is performed using light of suitable wavelength, such as ultraviolet radiation or visible light, according to the mechanism for radical generation using the photopolymerization initiator. For example, uniform light irradiation may be implemented with respect to a source material, such as a monomer, for preparing an optical material that has been molded via a light-transmitting material used for the substrate, such as a glass plate. The quantity of light in such irradiation may be selected according to, for example, the mechanism for radical generation using a photopolymerization initiator, and also according to the content ratio of the photopolymerization initiator.

In another embodiment, when a die-molded body layer of the optical material is produced by the photopolymerization reaction, the entire starting material, such as a die-molded monomer, may be uniformly irradiated with light employed for irradiation. Accordingly, in one version, light may be selected having a wavelength such that light irradiation can be uniformly performed via the light-transmitting material used for the substrate, such as for example a flat glass plate. In this case, decreasing the total thickness of the diffraction grating including the die-molded body of the optical material formed on the light-transmitting material used for the substrate may be more advantageous in terms of attaining objects in accordance with the present invention. Likewise, in another version, the die-molded body layer can be produced by a thermopolymerization method, and decreasing the total thickness of the diffraction grating including the die-molded body of the optical material formed on the light-transmitting material used for the substrate, may be more advantageous in terms of attaining the objects in accordance with the present invention.

According to aspects of the invention, by using the optical material in accordance with the present invention and employing the above-described method, it may be possible to produce, within a relatively short time, a diffractive optical element in which a plurality of layers comprising materials with different light wavelength dispersion are laminated on a substrate, and which is designed to increase the diffraction efficiency of a specific order of diffraction (e.g., designed order of diffraction) over substantially the entire range of employed wavelengths. Furthermore, at least one of a parting agent, a sensitizer, a stabilizer, and a thickening agent may be also introduced at the same time. In one version, an optical element in accordance with aspects of the present invention comprises a resin composition formed on a substrate, such as a glass substrate, where a surface of the resin composition is a diffractive surface formed in a diffractive grating shape. In another version, an optical element in accordance with aspects of the present invention comprises a resin composition formed on a substrate, such as a glass substrate, where a surface of the resin composition is a refractive surface formed in a convex or concave shape.

In one embodiment, the resin composition may be selected to provide predetermined optical characteristics. For example, in one version, the resin composition may have a refractive index (nd) that is $1.32<nd<1.53$. In another version, the resin composition may have an Abbe number (vd) of $14<vd<35$. In yet another version, a second-order dispersion characteristic ($\theta g$, F) of the resin composition may be $0.34<\theta g, F<0.47$. For example, in one version the resin composition may have a refractive index (nd) of the binder component (A) that is within a range of $1.31<nd<1.48$, and the fine metal oxide particles (B) may comprise ITO.

In yet another embodiment in accordance with aspects of the present invention, a laminated diffractive optical element is provided that comprises a first diffractive optical element that is formed from the above-described resin composition, and in which one surface is a diffractive surface having a diffractive shape. The laminated diffractive optical element also has a second diffractive optical element that has an Abbe number higher than that of the first diffractive optical element, and in which one surface is also a diffractive surface. According to this embodiment, the first diffractive optical element and the second diffractive optical element may be disposed in intimate contact with each other so that the diffractive surfaces thereof face each other. In one version, the second diffractive optical element may also be formed of a second resin composition having the binder component, fine metal oxide particles and polymerization initiator, as in the resin composition described above. Further examples of optical materials and laminated diffractive optical elements formed therefrom are described below.

EXAMPLES

The refractive index of light in an optical element usually changes rapidly with the decrease in wavelength, and the difference with the designed refractive index increases. Accordingly, the diffraction efficiency corresponding to the designed order of diffraction typically decreases with the decrease in wavelength. The inventors have unexpectedly found that such rapid change in the wavelength dispersion of a substance originates in the second-order dispersion characteristic $\theta g, F=(ng-nF)/(nF-nc)$ of refractive index, and that the diffraction efficiency can be increased by decreasing the second-order dispersion characteristic $\theta g$, F of the refractive index.

Figure 1B:
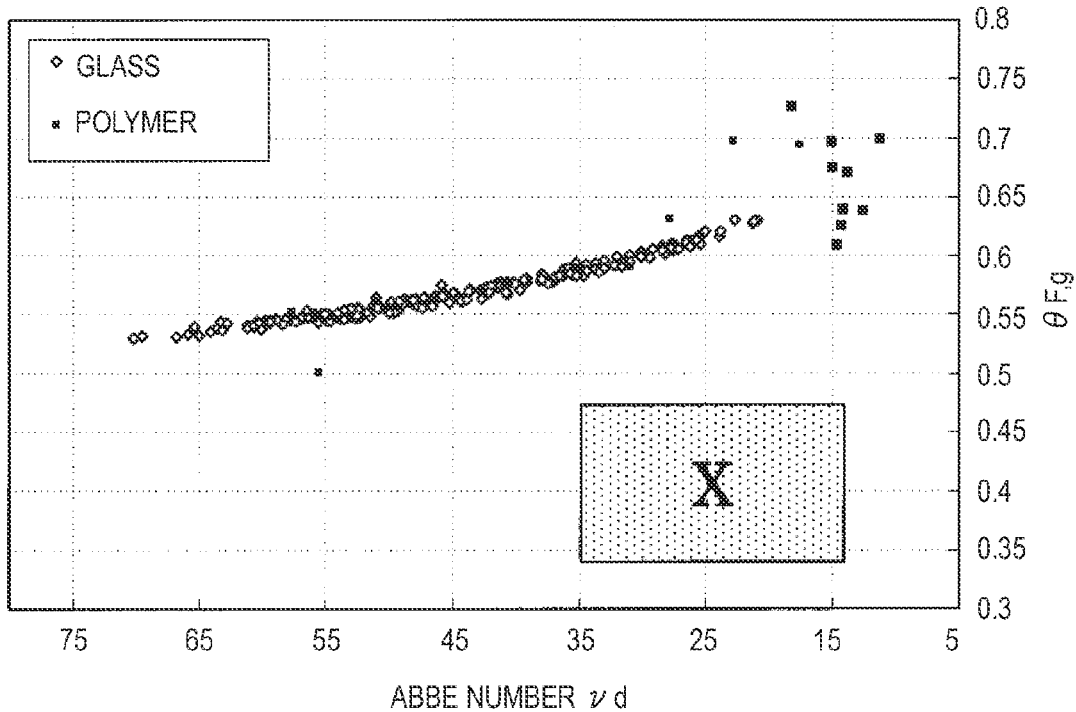
FIG. 1B is a graph illustrating the distributions of Abbe number and second-order dispersion characteristic in optical materials

FIG. 1B is a graph illustrating the relationship between the Abbe number and second-order dispersion characteristic of optical materials. In FIG. 1B, the second-order dispersion characteristic ($\theta g$, F) is plotted against the ordinate and the Abbe number vd is plotted against the abscissa. As follows from FIG. 1B, these optical materials clearly do not satisfy the following conditions: $14<vd<35$ and $0.34<\theta g, F<0.47$ (FIG. 1B: region X).

Embodiments of the preparation of an optical material in accordance with the present invention will be described below in greater detail. The refractive index was measured using an Abbe refractometer (produced by Kalnew Optical Industry Co., Ltd.). The transmittance and optical scattering ratio were measured using U-4000 (produced by Hitachi, Ltd.).

Example 1

The configuration of the embodiment of the laminated diffractive optical element of Example 1, and a method for manufacturing the same, will be described below with reference to FIGS. 2 to 5.

First, DISPERBYK 163 as a dispersant, and fine ITO particles with a mean particle size of 20 nm, were compounded with xylene to obtain a content ratio of 1.90 wt. % and 10.55 wt. %, respectively, and the components were dissolved and dispersed. As a result, a slurry in which fine ITO particles were dispersed in a xylene solvent was obtained. A total of 3.00 g of 3-perfluorobutyl-2-hydroxypropyl acrylate and 5.25 g of 2,2,3,3,4,4,5,5-octafluorohexane 1,6-diacrylate as binder components were added to and dissolved in 50.50 g of the slurry. A total of 0.255 g of Irgacure 184 was added and dissolved as a polymerization initiator. The solvent was removed under reduced pressure with an evaporator from the solution obtained, and an optical material 11 in accordance with the present invention was prepared. Properties of the optical material 11 are shown in Table 1.

Figure 2A:
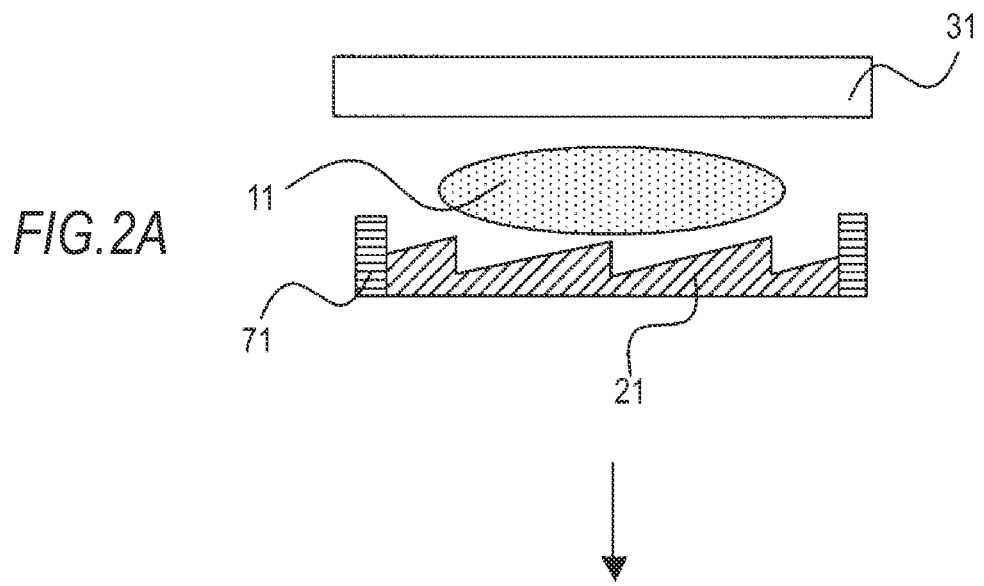
FIGS. 2A-2C are cross-sectional views illustrating an embodiment of a molding process of an optical element in Example 1.
Figure 2B:
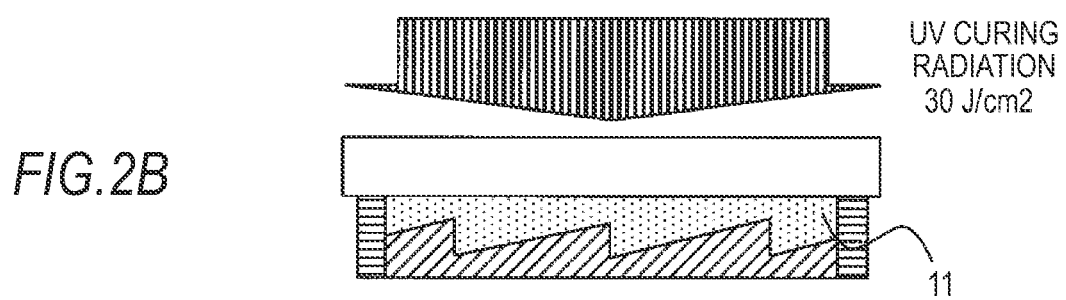
Figure 2C:
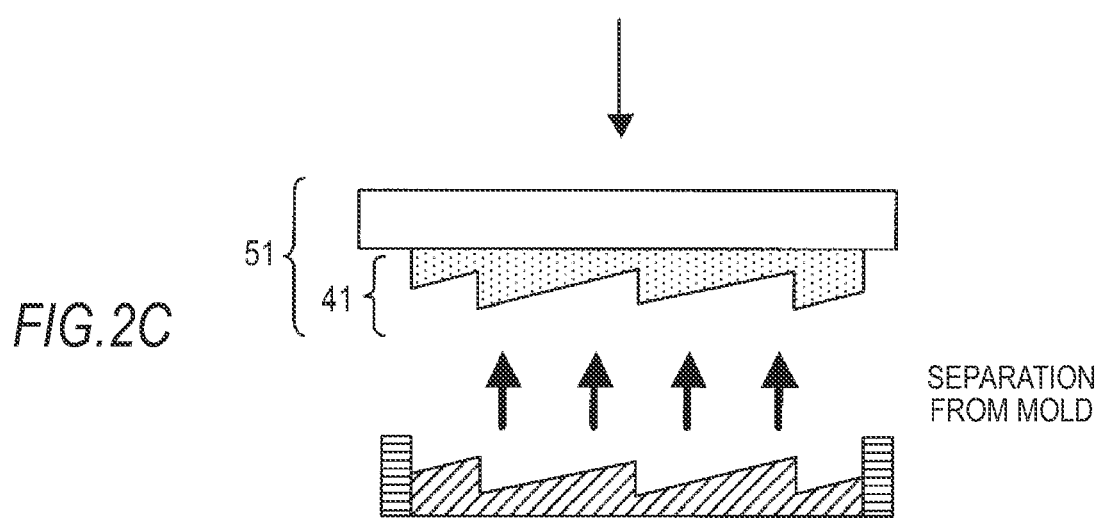

As shown in FIG. 2A, the optical material 11 was fed to a die 21 processed to have a diffraction grating shape according to the present example. A flat glass (BK7) plate 31 was then placed on the optical material 11, as shown in FIG. 2B, and irradiation was performed with a UV exposure device (EX250, produced by HOYA-SCHOTT Co.) at 30 J/cm$^2$ (40 mW/cm$^2$). Then, as shown in FIG. 2C, a cured optical element 41 was separated from the die 21, and a diffractive optical element 51 was produced. The reference numeral 71 stands for a spacer that may be used for adjusting the element thickness.

Figure 3A:
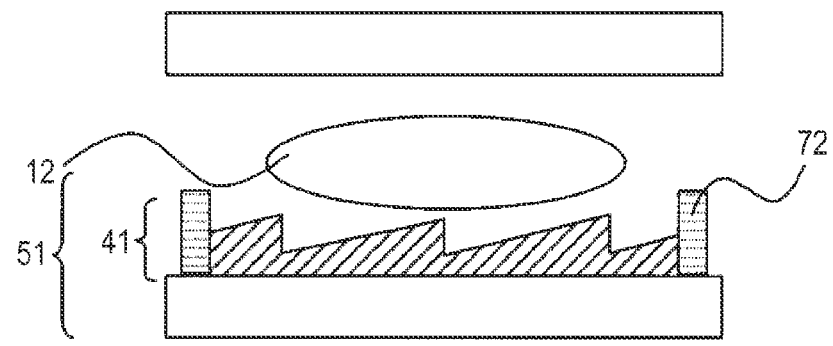
FIGS. 3A-3C are cross-sectional views illustrating an embodiment of a molding process of an optical element in Example 1.
Figure 4:
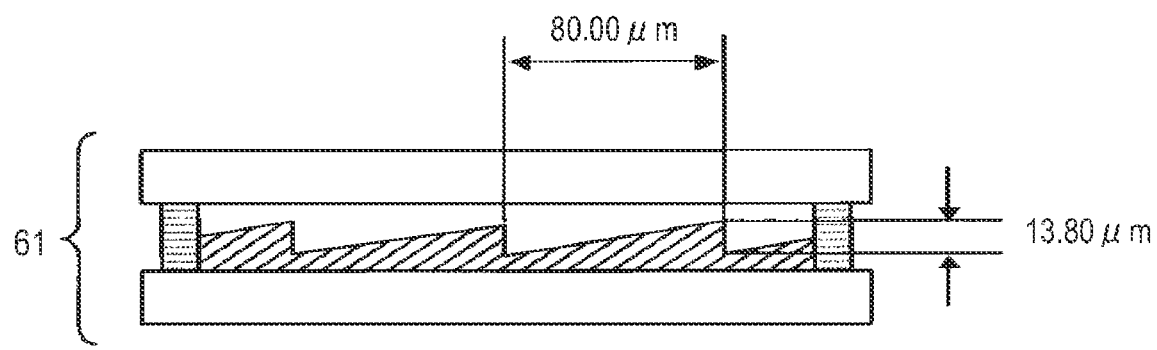
FIG. 4 is a cross-sectional view illustrating the structure of an embodiment of a laminated diffractive optical element in Example 1.

An optical material 12 and the above-described diffractive optical element 51 were used to produce a two-layer laminated diffractive optical element, as shown in FIG. 4. As shown in FIG. 3A, an appropriate amount of the optical material 12 in accordance with the present invention was fed to the molding surface of the diffractive optical element 51. RC-COO1 (manufactured by Dainippon Inks And Chemicals Co., Ltd.) was used as the optical material 12.

Figure 3B:
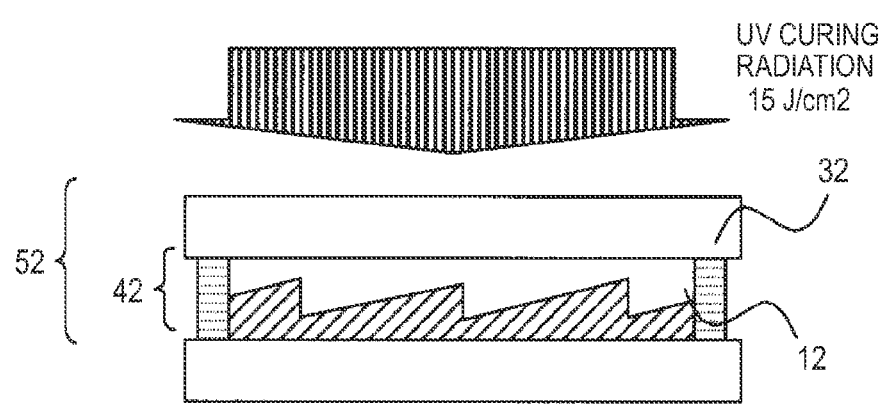
Figure 3C:
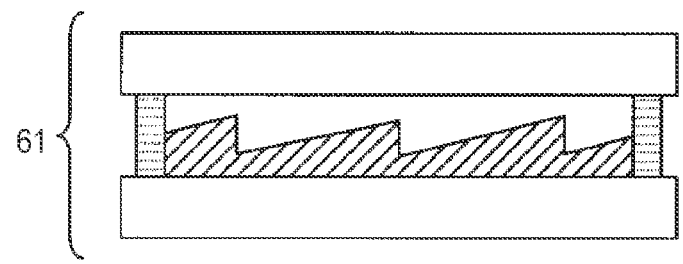

Then, as shown in FIG. 3B, a glass (BK7) plate 32 was placed on the optical material 12, irradiation was performed with a UV exposure device (EX250, produced by HOYA-SCHOTT Co.) at 15 J/cm$^2$ (40 mW/cm$^2$), and a diffractive optical element 52 combined with the diffractive optical element 51 was obtained. As shown in FIG. 3C, a two-layer laminated diffractive optical element 61 was thus produced. The reference numeral 72 stands for a spacer used for adjusting the element thickness. The optical material 12 used for molding the optical element 42 had the following optical characteristics: nd=1.5230, vd=51.07, $\theta g$, F=0.568.

As shown in FIG. 4, the grating pitch of the diffractive optical element 51 and diffractive optical element 52 was 80.00 μm. The height of peaks in the diffractive gratings of the diffractive optical element 51 and diffractive optical element 52 was 13.80 μm.

Figure 5:
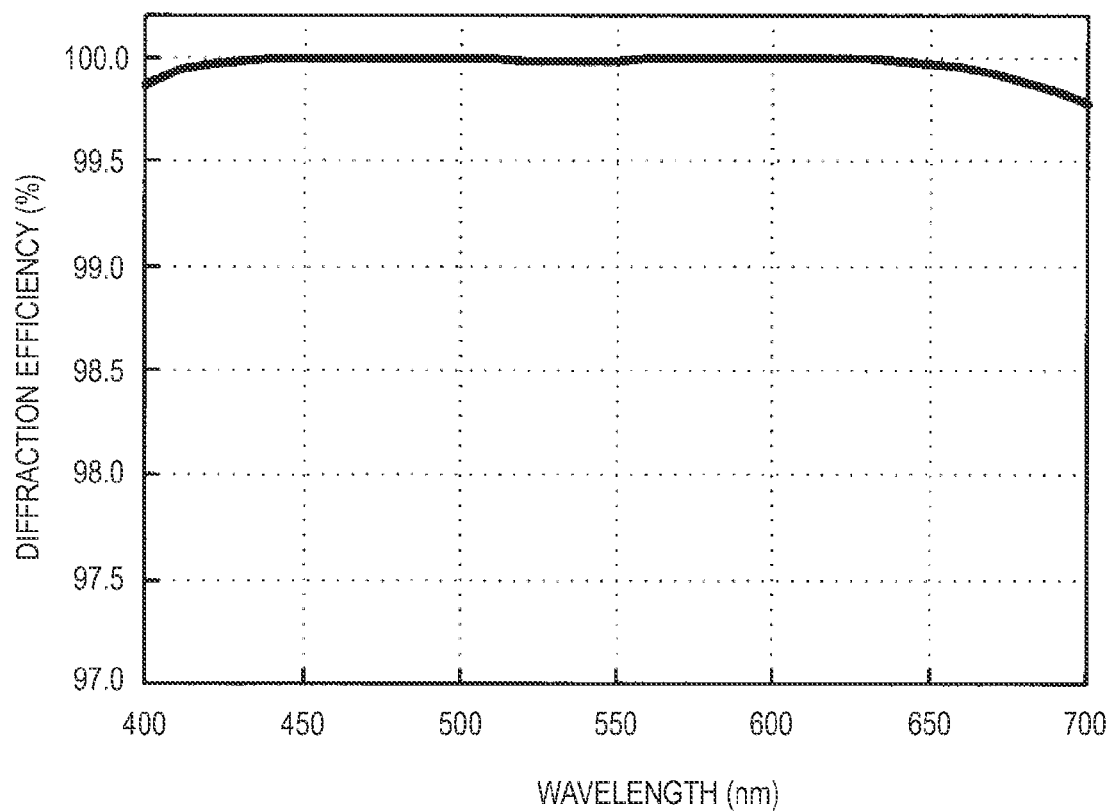
FIG. 5 is a graph illustrating the primary diffraction intensity of an embodiment of a laminated diffractive optical element in Example 1.

FIG. 5 is a graph showing the intensity at each wavelength (from 400 nm to 700 nm) of a primary diffraction light at an incidence angle of 0° in the produced laminated diffractive optical element 61. In the figure, the wavelength is plotted against the abscissa, and the diffraction efficiency is plotted against the ordinate. In FIG. 5, the diffraction efficiency at a wavelength of 400 nm is 99.9%, the diffraction efficiency at a wavelength of 500 nm is 100.0%, and the diffraction efficiency at a wavelength 700 nm is 99.8%. Therefore, the diffraction efficiency of the laminated diffractive optical element 61 is equal to or higher than 99.8% over the entire region of wavelengths employed, and it can be said that a very good wavelength distribution of intensity is demonstrated.

The diffraction efficiency as referred to herein is defined as a ratio of the quantity of light diffracted at various orders of diffraction, to the entire quantity of transmitted light flux.

Example 2

A total of 3.00 g of 3-perfluorobutyl-2-hydroxypropyl acrylate and 5.25 g of 2,2,3,3,4,4,5,5-octafluorohexane 1,6-diacrylate as binder components were added to and dissolved in 80.70 g of the slurry prepared in Example 1. A total of 0.255 g of Irgacure 184 was added and dissolved as a polymerization initiator. The solvent was removed under reduced pressure with an evaporator from the solution obtained, and an optical material 13 in accordance with the present invention was prepared. Properties of the optical material 13 are shown in Table 1.

A diffractive optical element was produced in the same manner as in Example 1 by using the optical material 13.

An optical material 14 was prepared for producing a diffractive optical element for combining with the above-described diffractive optical element. A photocurable resin with the following optical characteristics: nd=1.5274, vd=49.82, θg, F=0.552, was added to and dissolved in a slurry obtained by dispersing $Al_2O_3$ fine particles in a xylene solvent having a dispersant added thereto. The solvent was removed under reduced pressure with an evaporator from the solution obtained, and the optical material 14 was prepared. The optical material 14 had the following optical characteristics: nd=1.5706, vd=54.20, θg, F=0.567.

A diffractive optical element was obtained by using the obtained optical material 14 and combining it with the diffractive optical element produced using the optical material 13 in the same manner as in Example 1. A two-layer laminated diffractive optical element was thus produced.

The grating pitch of the diffractive optical elements was 80.00 μm. The height of peaks in the diffractive gratings of the diffractive optical elements was 8.90 μm. The height of the grating peaks can also be designed to be lower by about 4.8 μm than the peak height of the diffraction grating described in Example 1. As a result, it is possible to obtain an optical element in which the effect of edge flare produced by the diffraction grating is further inhibited.

Figure 6:
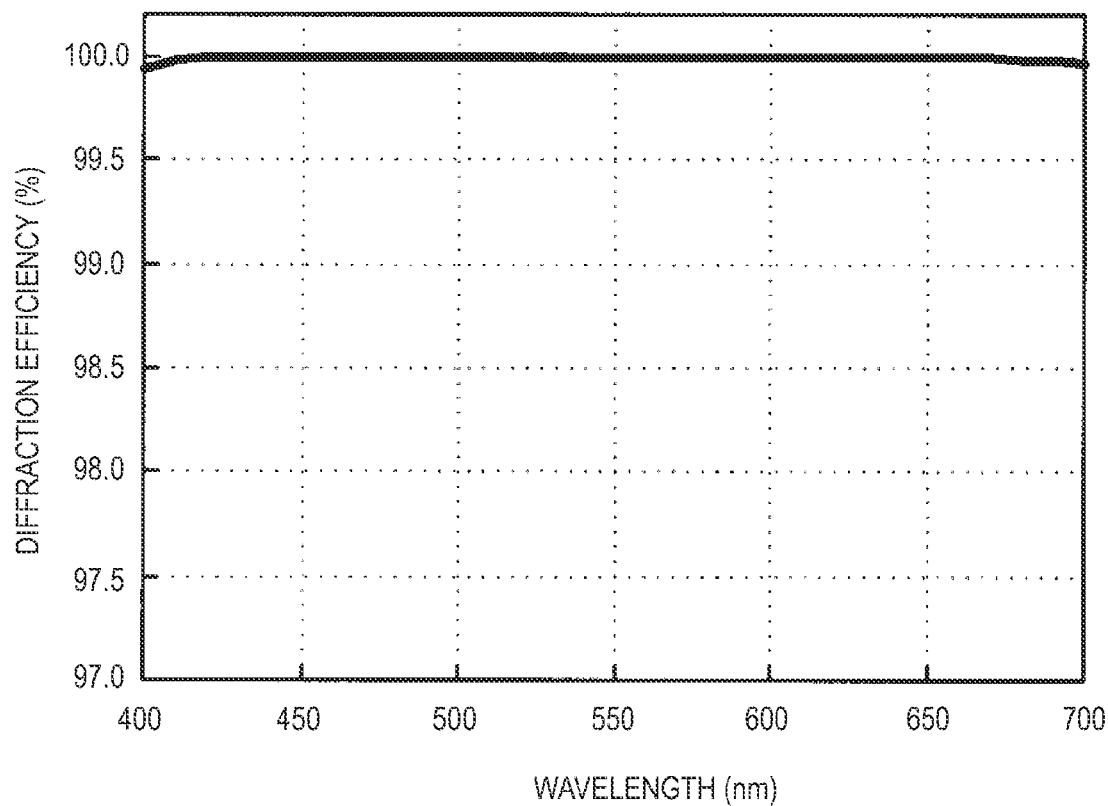
FIG. 6 is a graph illustrating the primary diffraction intensity of an embodiment of a laminated diffractive optical element in Example 2.

FIG. 6 is a graph showing the intensity at each wavelength (from 400 nm to 700 nm) of a primary diffraction light at an incidence angle of 0° in the produced laminated diffractive optical element. In the figure, the wavelength is plotted against the abscissa, and the diffraction efficiency is plotted against the ordinate. In FIG. 6, the diffraction efficiency at a wavelength of 400 nm is 99.9%, the diffraction efficiency at a wavelength of 500 nm is 100.0%, and the diffraction efficiency at a wavelength 700 nm is 99.9%. Therefore, the diffraction efficiency of the laminated diffractive optical element 61 is equal to or higher than 99.9% over the entire region of wavelengths employed, and it can be said that a very good wavelength distribution of intensity is demonstrated.

Example 3

A total of 3.00 g of 3-perfluorobutyl-2-hydroxypropyl acrylate and 5.25 g of 2,2,3,3,4,4,5,5-octafluorohexane 1,6-diacrylate as binder components were added to and dissolved in 119.80 g of the slurry prepared in Example 1. A total of 0.255 g of Irgacure 184 was added and dissolved as a polymerization initiator. The solvent was removed under reduced pressure with an evaporator from the solution obtained, and an optical material 15 in accordance with the present invention was prepared. Properties of the optical material 15 are shown in Table 1.

A diffractive optical element was produced in the same manner as in Example 1 by using the optical material 15.

An optical material 16 was prepared for producing a diffractive optical element for combining with the above-described diffractive optical element. A photocurable resin with the following optical characteristics shown in Example 2: nd=1.5274, vd=49.82, θg, F=0.552, was added to and dissolved in a slurry obtained by dispersing $ZrO_2$ fine particles in a xylene solvent having a dispersant added thereto. The solvent was removed under reduced pressure with an evaporator from the solution obtained, and the optical material 16 with properties described in Table 1 was prepared. The optical material 16 had the following optical characteristics: nd=1.6086, vd=45.18, θg, F=0.548.

A diffractive optical element was obtained by using the obtained optical material 16 and combining it with the diffractive optical element produced using the optical material 15 in the same manner as in Example 1. A two-layer laminated diffractive optical element was thus produced.

The grating pitch of the diffractive optical elements was 80.00 μm. The height of peaks in the diffractive gratings of the diffractive optical elements was 7.32 μm. The height of the grating peaks can also be designed to be lower by about 1.6 μm than the peak height of the diffraction grating described in Example 2. As a result, it is possible to obtain an optical element in which the effect of edge flare produced by the diffraction grating is still further inhibited.

Figure 7:
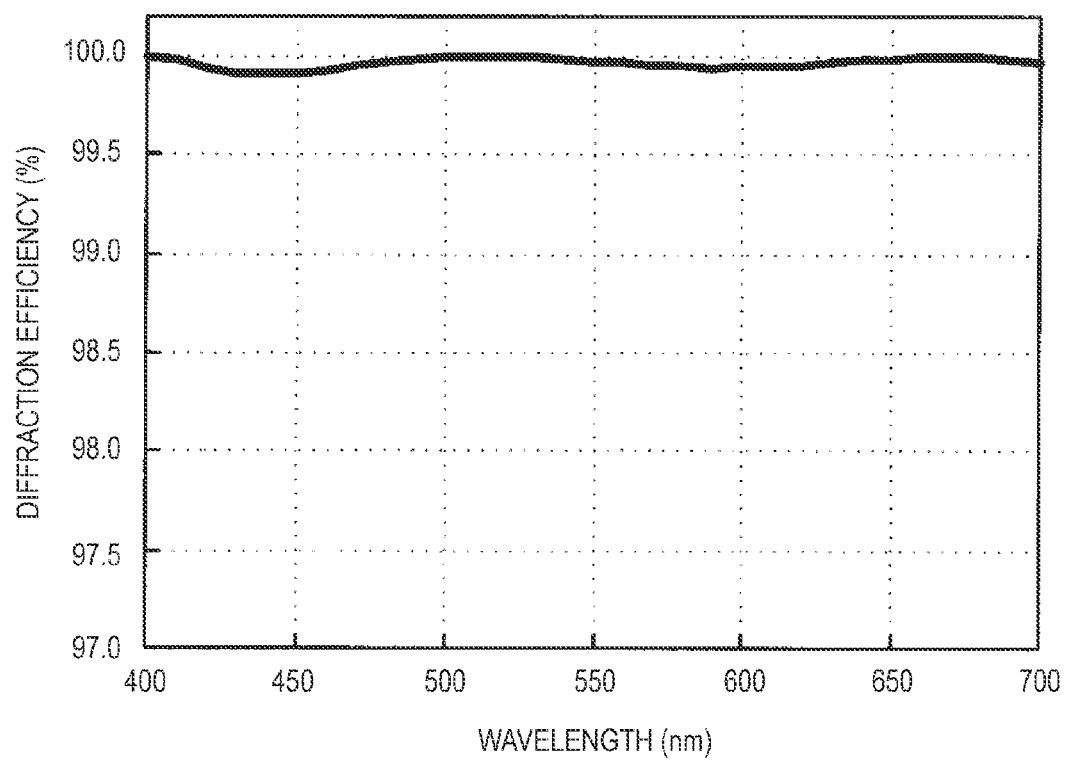
FIG. 7 is a graph illustrating the primary diffraction intensity of an embodiment of a laminated diffractive optical element in Example 3.

FIG. 7 is a graph showing the intensity at each wavelength (from 400 nm to 700 nm) of a primary diffraction light at an incidence angle of 0° in the produced laminated diffractive optical element. In the figure, the wavelength is plotted against the abscissa, and the diffraction efficiency is plotted against the ordinate. In FIG. 7, the diffraction efficiency at a wavelength of 400 nm is 100.0%, the diffraction efficiency at a wavelength of 500 nm is 100.0%, and the diffraction efficiency at a wavelength 700 nm is 100.0%. Therefore, the diffraction efficiency of the laminated diffractive optical element 61 is close to 100.0% over the entire region of wavelengths employed, and it can be said that improved, and even the best, wavelength distribution of intensity is demonstrated.

Example 4

A total of 0.255 g of 3-acryloxypropyltrimethoxysilane as a binder component and Irgacure 184 as a polymerization initiator were added to and dissolved in 53.12 g of the slurry prepared in Example 1. The solvent was removed under reduced pressure with an evaporator from the solution obtained, and an optical material 17 in accordance with the present invention was prepared. Properties of the optical material 17 are shown in Table 1.

A diffractive optical element was produced in the same manner as in Example 1 by using the optical material 17.

An optical material 12 used in Example 1 was prepared for producing a diffractive optical element for combining with the above-described diffractive optical element.

A diffractive optical element was obtained by using the optical material 12 and combining it with the diffractive optical element produced using the optical material 17 in the same manner as in Example 1. A two-layer laminated diffractive optical element was thus produced.

The grating pitch of the diffractive optical elements was 80.00 μm. The height of peaks in the diffractive gratings of the diffractive optical elements was 17.86 μm. The height of the grating peaks can also be designed to be higher by about 4.1 μm than the peak height of the diffraction grating described in Example 1.

Figure 8:
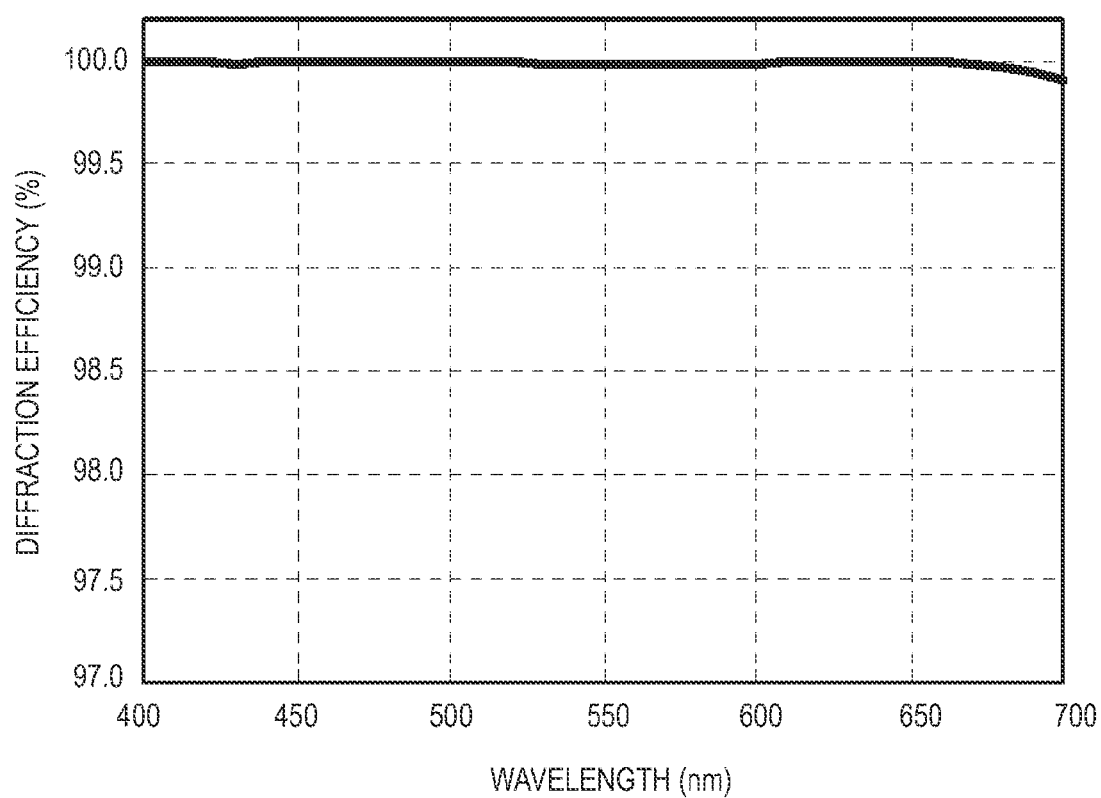
FIG. 8 is a graph illustrating the primary diffraction intensity of an embodiment of a laminated diffractive optical element in Example 4.

FIG. 8 is a graph showing the intensity at each wavelength (from 400 nm to 700 nm) of a primary diffraction light at an incidence angle of 0° in the produced laminated diffractive optical element. In the figure, the wavelength is plotted against the abscissa, and the diffraction efficiency is plotted against the ordinate.

In FIG. 8, the diffraction efficiency at a wavelength of 400 nm is 100.0%, the diffraction efficiency at a wavelength of 500 nm is 100.0%, and the diffraction efficiency at a wavelength 700 nm is 99.9%. Therefore, the diffraction efficiency is close to 100.0% over the entire region of wavelengths employed, and it can be said that improved, and even the best, wavelength distribution of intensity is demonstrated.

Comparative Example 1

A laminated diffractive optical element was produced by using an optical material 18 containing only the binder components such as were used in Example 1 to Example 3 (i.e., a resin in which 3-perfluorobutyl-2-hydroxypropyl acrylate, 2,3,3,4,4,5,5-octafluorohexane 1,6-diacrylate, and Irgacure 184 were used at the same ratios as in examples 1-3) instead of the optical material 11 described in Example 1.

Figure 9:
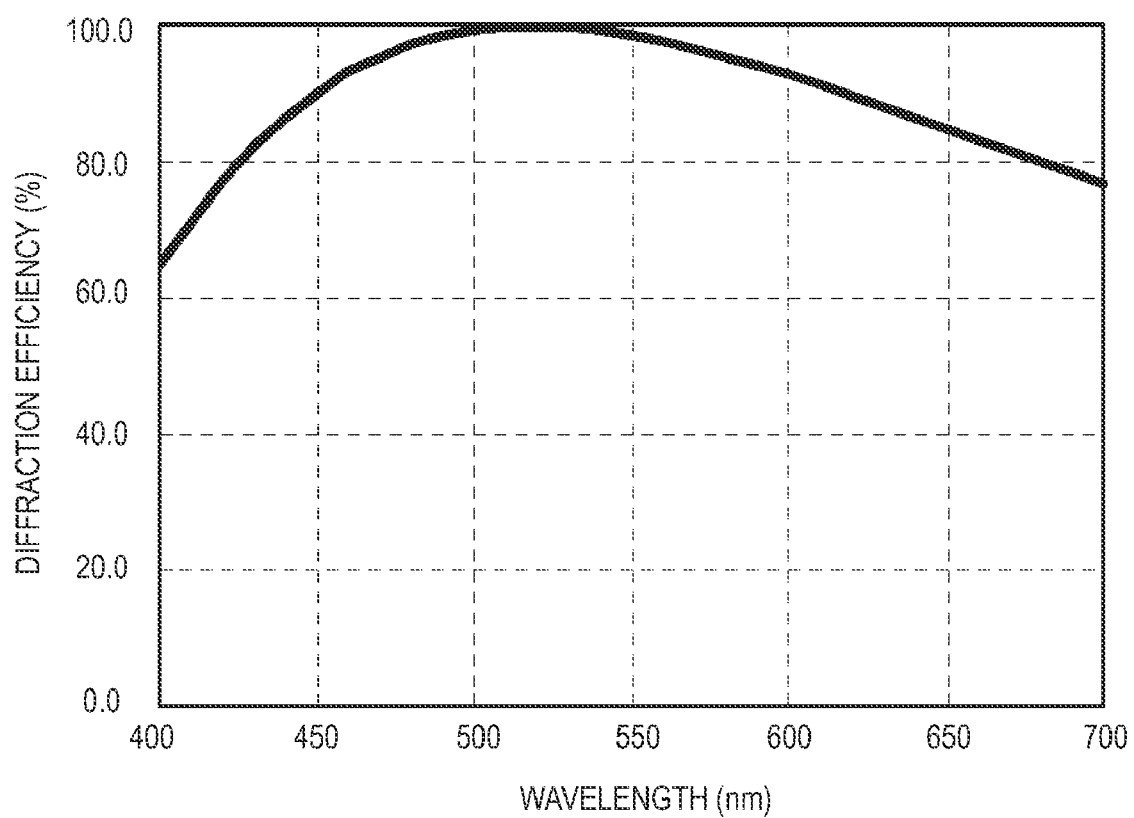
FIG. 9 is a graph illustrating the primary diffraction intensity of the laminated diffractive optical element in Comparative Example 1.

FIG. 9 is a graph showing the intensity at each wavelength (from 400 nm to 700 nm) of a primary diffraction light at an incidence angle of 0° in the produced laminated diffractive optical element. In the figure, the wavelength is plotted against the abscissa, and the diffraction efficiency is plotted against the ordinate. The diffraction efficiency at wavelengths 400 nm and 700 nm decreased below 80%, and thus good wavelength distribution of intensity was not obtained.

Comparative Example 2

A laminated diffractive optical element was produced by using an optical material 18 described in Comparative Example 1 instead of the optical material 13 described in Example 2.

Figure 10:
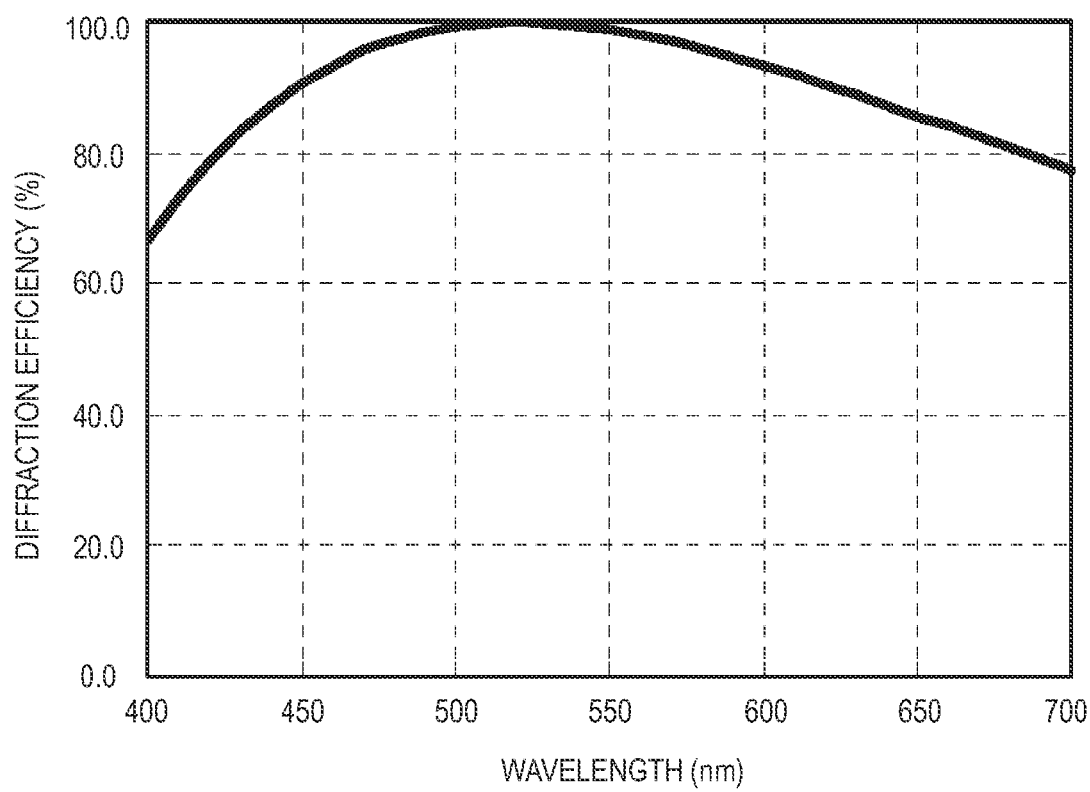
FIG. 10 is a graph illustrating the primary diffraction intensity of the laminated diffractive optical element in Comparative Example 2.

FIG. 10 is a graph showing the intensity at each wavelength (from 400 nm to 700 nm) of a primary diffraction light at an incidence angle of 0° in the produced laminated diffractive optical element. In the figure, the wavelength is plotted against the abscissa, and the diffraction efficiency is plotted against the ordinate. In FIG. 10, the diffraction efficiency at wavelengths 400 nm and 700 nm decreased below 80%, and thus good wavelength distribution of intensity was not obtained.

Comparative Example 3

A laminated diffractive optical element was produced by using an optical material 18 described in Comparative Example 1 instead of the optical material 15 described in Example 3.

Figure 11:
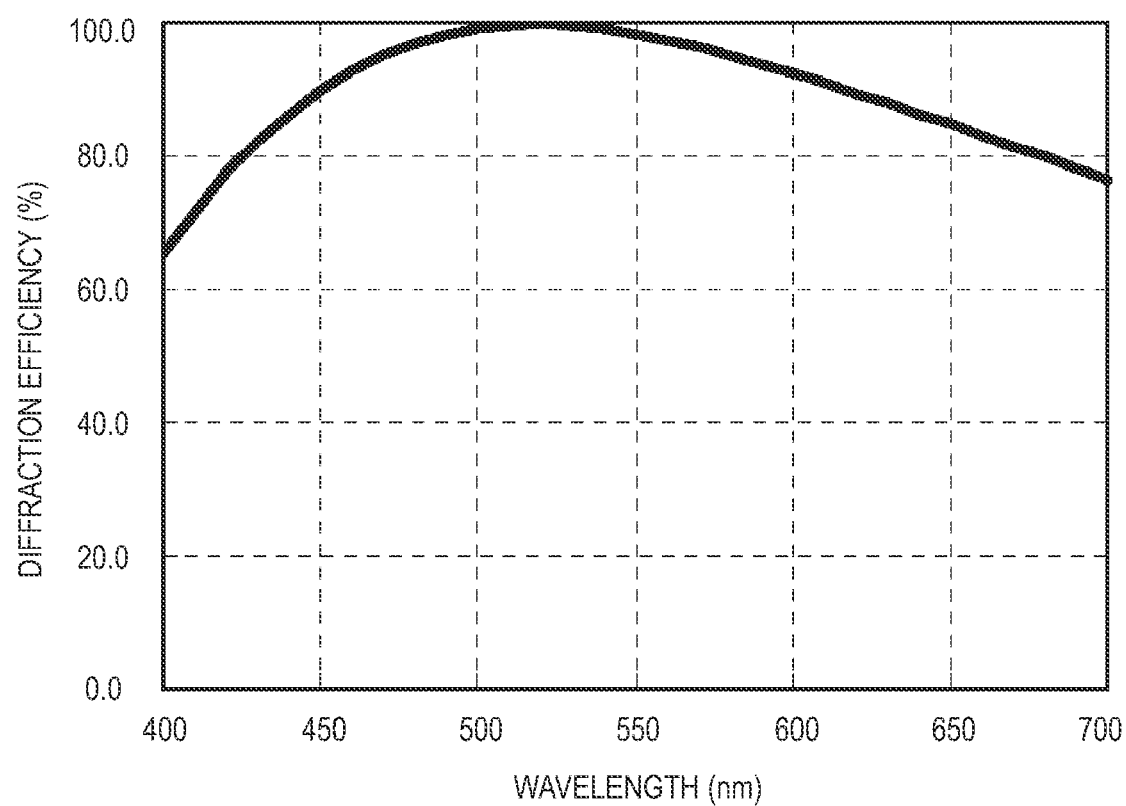
FIG. 11 is a graph illustrating the primary diffraction intensity of the laminated diffractive optical element in Comparative Example 3.

FIG. 11 is a graph showing the intensity at each wavelength (from 400 nm to 700 nm) of a primary diffraction light at an incidence angle of 0° in the produced laminated diffractive optical element. In the figure, the wavelength is plotted against the abscissa, and the diffraction efficiency is plotted against the ordinate. In FIG. 11, the diffraction efficiency at wavelengths 400 nm and 700 nm decreased below 80%, and thus good wavelength distribution of intensity was not obtained.

Comparative Example 4

A laminated diffractive optical element was produced by using an optical material 19 containing only the binder components such as were used in Example 4 (i.e., a resin in which 3-acryloxypropyltrimethoxysilane and Irgacure 184 were used at the same ratios as in Example 4) instead of the optical material 17 described in Example 4.

Figure 12:
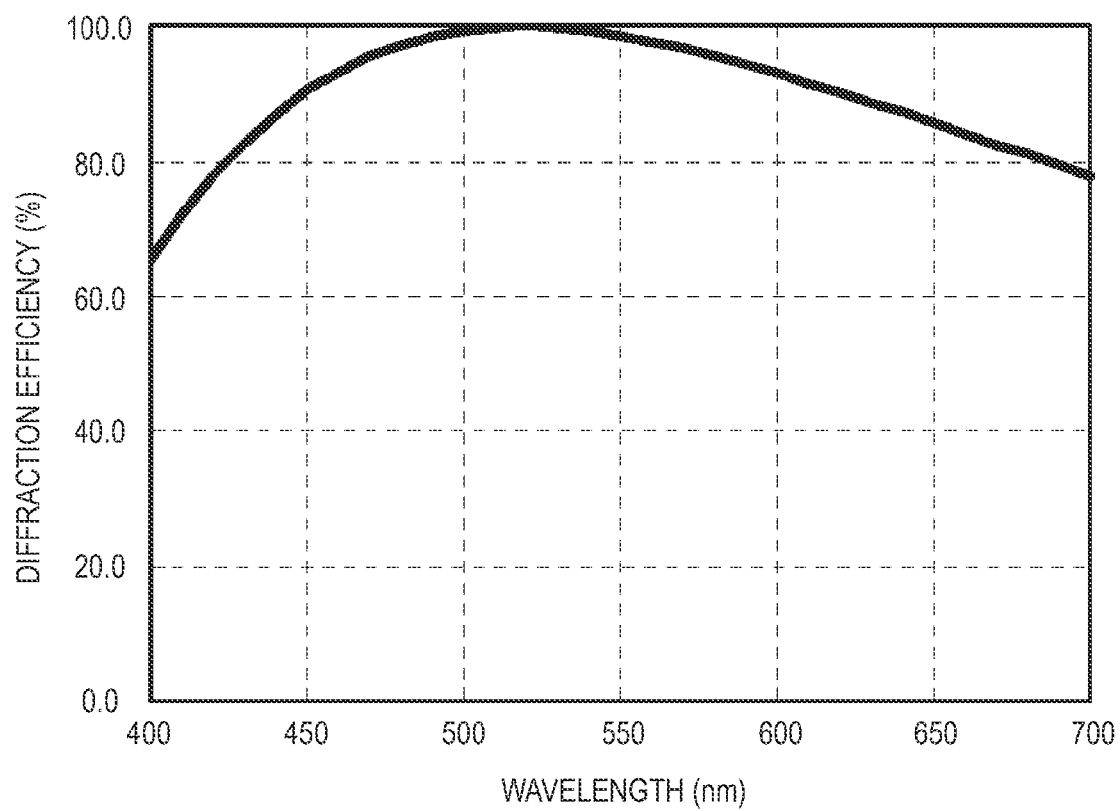
FIG. 12 is a graph illustrating the primary diffraction intensity of the laminated diffractive optical element in Comparative Example 4.

FIG. 12 is a graph showing the intensity at each wavelength (from 400 nm to 700 nm) of a primary diffraction light at an incidence angle of 0° in the produced laminated diffractive optical element. In the figure, the wavelength is plotted against the abscissa, and the diffraction efficiency is plotted against the ordinate. In FIG. 12, the diffraction efficiency at wavelengths 400 nm and 700 nm decreased below 80%, and thus good wavelength distribution of intensity was not obtained.

Figure 13:
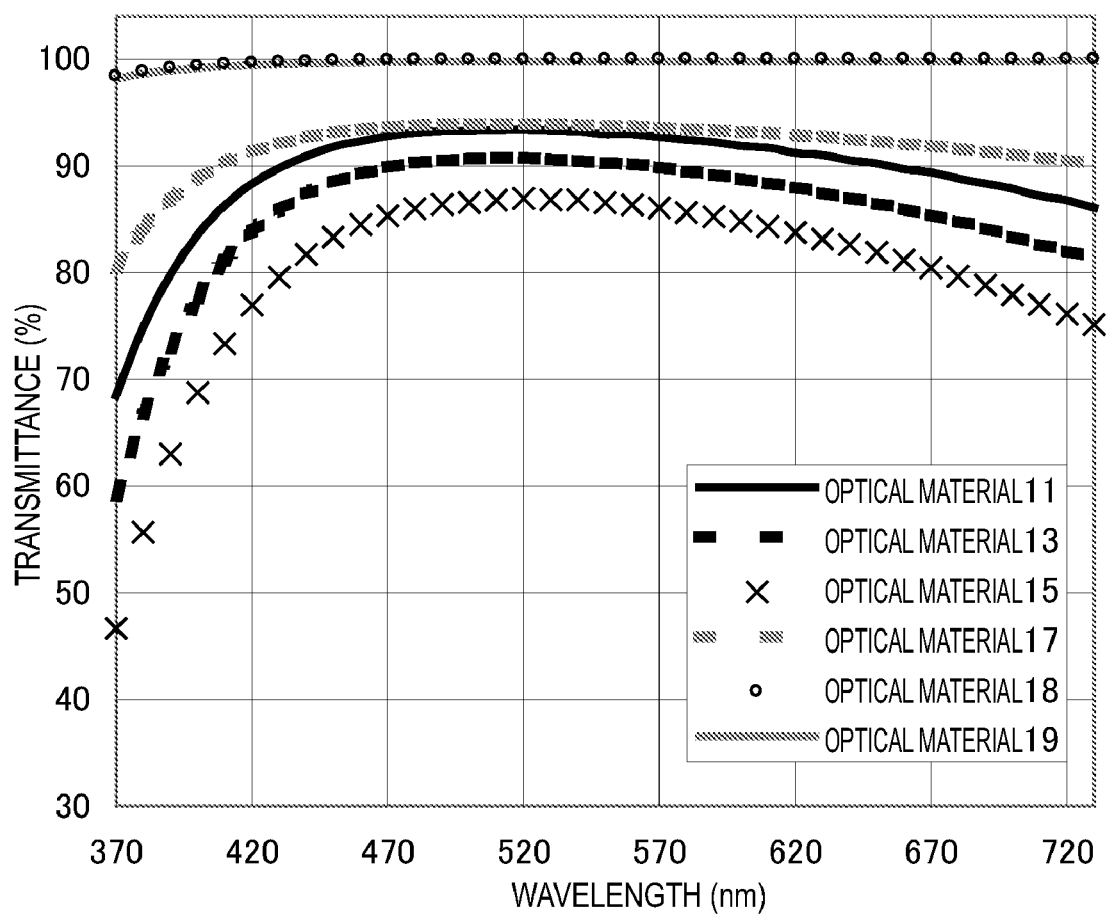
FIG. 13 is a graph illustrating the transmittance of embodiments of optical materials 11, 13, 15, 17, 18, 19 (a spacer with a film thickness of 10 μm is used).
Figure 14:
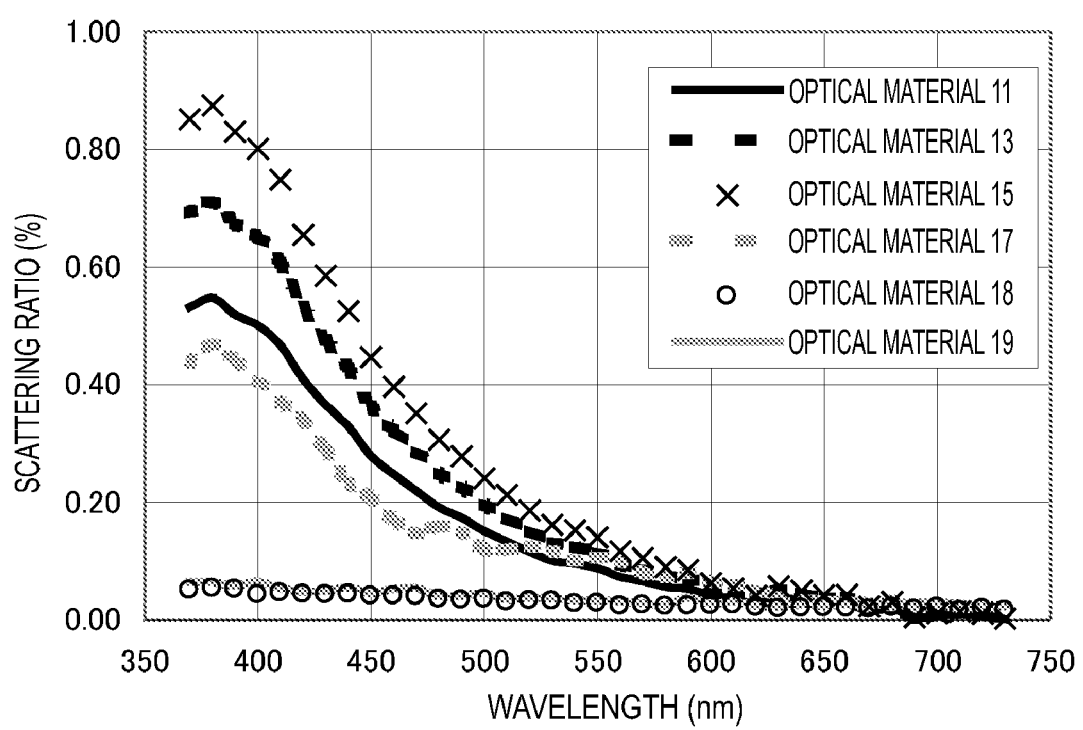
FIG. 14 is a graph illustrating the optical scattering ratio of embodiments of optical materials 11, 13, 15, 17, 18, 19 (a spacer with a film thickness of 10 μm is used).

Table 1 shows optical properties, volume fraction of ITO fine particles, transmittance, and light scattering ratios (400 nm, 500 nm, 700 nm) of optical materials 11, 13, 15, 17 used in Examples 1 to 4 and optical materials 18, 19 used in Comparative Examples 1 to 4, and also the height of peaks of diffraction gratings and diffraction efficiency results at each wavelength (400 nm, 500 nm, 700 nm) of the primary diffraction light with an incidence angle of 0°, in the diffraction optical elements fabricated using the aforementioned optical materials. Films were produced using the optical materials 11, 13, 15, 17 and optical materials 18, 19, and employing a 10 μm spacer. These films were used to evaluate the transmittance and light scattering ratio of thin films of the optical materials. The measurement results relating to the transmittance and light scattering ratio are shown in FIG. 13 and FIG. 14.

The diffraction efficiency of a laminated diffractive optical element that is equal to or higher than 99% is typically considered to be good. Accordingly, the Good/Poor (○/X) determination in the present test was made based on whether or not the diffraction efficiency was equal to or higher than 99% over the entire visible range region of measurement wavelengths from 400 to 700 nm. Whether the grating height was good (○) or poor (Δ) was determined based on the flare that depends on the grating height.

Evaluation of Diffraction Efficiency

○: diffraction efficiency is equal to or higher than 99% over the entire visible range region of measurement wavelengths from 400 to 700 nm.

X: diffraction efficiency is less than 99% over the entire visible range region of measurement wavelengths from 400 to 700 nm.

Evaluation of Grating Height

Where the grating height is excessively large, the incident light is scattered by the grating, thereby creating flare. Therefore, from the standpoint of flare, the grating height may be designed to be small.

○: grating height is less than 20 μm.
Δ: grating height is equal to or larger than 20 μm.

with good efficiency, and weight and size can be reduced. The obtained optical element may also in certain embodiments have very good diffraction efficiency, and because a small grating height can be designed, the occurrence of flare may be low.

Also, as for the material constitution, in those versions where a fluorine system is used as a binder component in the

TABLE 1

| | | Example 1 | Example 2 | Example 3 | Example 6 | Comparative example 1 | Comparative example 2 | Comparative example 3 | Comparative example 4 |
|---|---|---|---|---|---|---|---|---|---|
| Optical material | | 11 | 13 | 15 | 17 | | 18 | | 19 |
| Refractive index (: nd) | | 1.4805 | 1.5051 | 1.5293 | 1.4903 | | 1.4196 | | 1.4547 |
| Abbe number (: νd) | | 20.67 | 17.05 | 14.79 | 24.61 | | 59.90 | | 52.72 |
| Second-order dispersion characteristic (: θgF) | | 0.408 | 0.394 | 0.385 | 0.423 | | 0.549 | | 0.536 |
| Transmittance [%] | 400 [nm] | 83.5 | 77.6 | 68.7 | 88.8 | | 99.3 | | 99.1 |
| | 500 [nm] | 93.3 | 90.6 | 86.6 | 93.9 | | 100 | | 99.8 |
| | 700 [nm] | 87.8 | 83.4 | 77.9 | 91.1 | | 100 | | 99.8 |
| Light scattering ratio [%] | 400 [nm] | 0.50 | 0.65 | 0.80 | 0.41 | | <0.1 | | <0.1 |
| | 500 [nm] | 0.15 | 0.20 | 0.24 | 0.12 | | <0.05 | | <0.05 |
| | 700 [nm] | <0.05 | <0.05 | <0.05 | <0.05 | | <0.05 | | <0.05 |
| Volume fraction of ITO fine particle [%] | | 10.49 | 14.85 | 19.20 | 8.61 | | 0.00 | | 0.00 |
| Diffraction efficiency [%] | 400 [nm] | 99.9 | 99.9 | 100.0 | 100.0 | 64.7 | 66.7 | 65.5 | 65.6 |
| | 500 [nm] | 100.0 | 100.0 | 100.0 | 100.0 | 99.5 | 99.4 | 99.4 | 99.5 |
| | 700 [nm] | 99.8 | 99.9 | 100.0 | 99.9 | 76.8 | 77.6 | 76.8 | 77.9 |
| | Good/Poor determination | ○ | ○ | ○ | ○ | X | X | X | X |
| Grating height [μm] | | 13.80 | 8.96 | 7.32 | 17.86 | 4.95 | 3.41 | 2.70 | 7.51 |
| | Good/Poor determination | ○ | ○ | ○ | ○ | ○ | ○ | ○ | ○ |

As follows from Table 1, the laminated diffractive optical elements molded using optical materials 11, 13, 15, 17 of Examples 1 to 4 that had optical properties in accordance with aspects of the present invention demonstrated very good diffraction efficiency over the entire visible range. Furthermore, in Example 2 and Example 3, the grating height could be further decreased, while still maintaining a relatively high diffraction efficiency.

By contrast, the laminated diffractive optical elements molded using the optical material 18 described in Comparative Examples 1 to 3 and the optical material 19 described in Comparative Example 4, which did not have optical properties in accordance with aspects of the present invention, had a small grating height, but also demonstrated a local drop in diffraction efficiency in a relatively short wavelength region.

The resin compositions of the examples in accordance with the invention may thus be capable of providing a low refractive index and high dispersion, a second-order dispersion characteristic, and also having processability, low hygroscopicity, optical scattering ability, and environment endurance characteristic, and may also provide an optical element molded from the resin composition.

The resin compositions of the examples in accordance with the invention may also be used to provide a diffractive optical element and a laminated diffractive optical element molded using the resin composition.

The resin composition in accordance with aspects of the present invention may be used as an optical material, and with the optical material comprising the resin composition, in certain embodiments it may be possible to obtain a low refractive index, a high dispersion, and a second-order dispersion characteristic, while also controlling the dispersivity of fine particles relating to the optical scattering characteristic. As a result, in embodiments of an optical system having installed therein an optical element molded from the optical material, chromatic aberration can be reduced and even eliminated with good efficiency, and weight and size can be reduced. The obtained optical element may also in certain embodiments have very good diffraction efficiency, and because a small grating height can be designed, the occurrence of flare may be low.

Also, as for the material constitution, in those versions where a fluorine system is used as a binder component in the resin, hygroscopicity can be controlled to a low level that is suitable for optical elements. Also, in those versions where the resin configuration includes a binder component based on a monomer and/or oligomer of at least one of a fluorine system and a silicone system that has a polymerizable functional group, and also a polymerization initiator, a resin curable by active energy can be obtained and relatively high processability can be imparted. As a result, according to aspects of the invention, optical elements of complex shape can be produced with good efficiency at a relatively low cost. In one version, when the shape is transferred using a die or the like in the manufacturing process, because F or Si atoms are contained, excellent parting ability may be provided.

Furthermore, according to one aspect of the invention, when a laminated diffractive element configuration in which diffractive elements are brought into intimate contact with each other is obtained by using the optical material comprising the resin composition in accordance with the present invention, the effect of flare can be reduced even further. In one version, with regard to the structural configuration of the optical elements, because they are fixed to each other in the laminated configuration in which they are brought into intimate contact, reliability against environment can be increased.

According to aspects of the invention, with the optical material comprising the resin composition in accordance with the present invention, it may be possible to demonstrate a relatively low refractive index, a relatively high dispersion, and a second-order dispersion characteristic, while controlling the dispersivity of fine particles relating to the optical scattering characteristic. Therefore, in certain embodiments, the optical material can be used in one or more of optical elements, diffractive optical elements, laminated diffractive optical elements, and optical systems, for example in pick-up optical systems such as cameras.

While the present invention has been described with reference to exemplary embodiments, it is to be understood that the invention is not limited to only the exemplary embodiments disclosed herein. The scope of the following claims is to be accorded the broadest interpretation so as to encompass all such modifications and equivalent structures and functions.

This application claims the benefit of Japanese Patent Application No. 2008-010932, filed Jan. 21, 2008 and Japanese Patent Application No. 2008-307587, filed Dec. 2, 2008, which are hereby incorporated by reference herein in its entirety.

What is claimed is:

1. A laminated diffractive optical element comprising:
a first diffractive optical element that is formed from a resin composition, and in which one surface is a diffractive surface having a diffractive shape; and
a second diffractive optical element that has an Abbe number higher than that of the first diffractive optical element, and in which one surface is a diffractive surface having a diffractive shape,
wherein the first diffractive optical element and the second diffractive optical element are disposed in intimate contact with each other so that the diffractive surfaces thereof face each other,
wherein the resin composition is a cured composition formed from:
(A) at least one of a monomer and an oligomer of one or more of a fluorine system and a silicone system having a polymerizable functional group in a molecule;
(B) fine metal oxide particles; and
(C) a polymerization initiator,
wherein the fine metal oxide particles comprise particles selected from the group consisting of zinc oxide, indium oxide, tin oxide, antimony oxide, tin-doped indium oxide (ITO), antimony-doped tin oxide (ATO), zinc-doped indium oxide (IZO), aluminum-doped zinc oxide (AZO), and fluorine-doped tin oxide (FTO), and
wherein the refractive index (nd) of the resin composition is $1.32 \leq nd < 1.53$, and the Abbe number (vd) of the resin composition is $14 < vd \leq 35$, and the second-order dispersion characteristic ($\theta g, F$) of the resin composition is $0.34 < \theta g, F < 0.47$.

2. The laminated diffractive optical element according to claim 1, wherein
a mean particle size of the fine metal oxide particles is within a range of equal to or larger than 2 nm and equal to or lower than 30 nm, and 95% or more of the fine metal oxide particles have a particle diameter equal to or less than 30 nm.

3. The laminated diffractive optical element according to claim 1, wherein
the mixing ratio of the (A) binder component and (B) fine metal oxide particles, represented by a volume ratio, is within a range of A:B=(99 to 75):(1 to 25).

4. A laminated diffractive optical element according to claim 1, in which the resin composition is formed on a glass substrate.

* * * * *